Sept. 30, 1941.  A. L. LANGEL  2,257,468
COVER FOR BAKING PANS
Filed Sept. 15, 1939
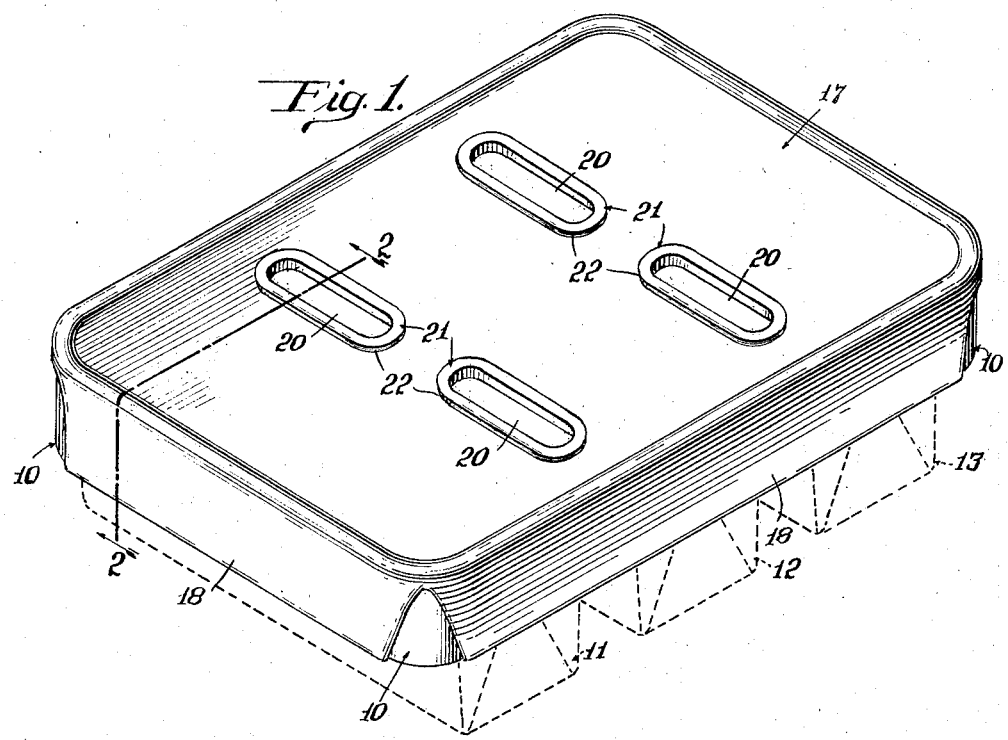
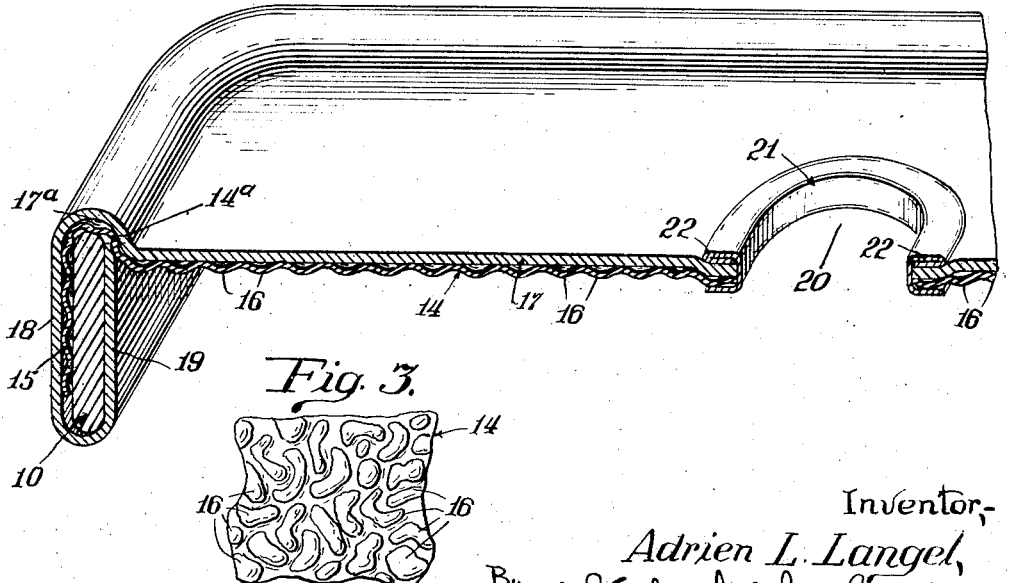
Inventor—
Adrien L. Langel,
By Zabel, Carlson, Gritzbaugh and Wiles,
Attorneys.

Patented Sept. 30, 1941

2,257,468

UNITED STATES PATENT OFFICE 2,257,468

COVER FOR BAKING PANS

Adrien L. Langel, Chicago, Ill., assignor to Chicago Metallic Manufacturing Company, Chicago, Ill., a corporation of Illinois Application September 15, 1939, Serial No. 295,022

3 Claims. (Cl. 53—6)

This invention relates to covers for baking pans and particularly to covers for multiple unit pans such as are employed for baking sandwich bread in connection with which it is preferable that the loaves be substantially square in cross section. For obtaining this result a cover is provided of a size adapted to fit about the sides and ends of the several pans and of such weight that the cover normally presses downwardly with a substantial degree of pressure so as to limit the upward expansion of the loaves and to cause the loaf as a whole to be effectively squared during the expansion of the baking operation. In the arrangement shown, a cover of this type is provided with a lining of tin plate or the like whose inner surface is roughened so as to cause a substantially stippled effect on the top face of the loaf of bread. It is one of the objects of this invention to provide an improved construction of attaching means for securing the lining in position in the cover member, the arrangement as shown in the drawing comprising a plurality of ferrules secured in position about vent openings through the cover opposite to the points between the several pans.

It is another object of this invention to improve devices of this type in sundry details hereinafter pointed out. The preferred means by which the several objects have been attained are illustrated in the accompanying drawing, in which—

Fig. 1 is a perspective view of a preferred embodiment of the improved structure;

Fig. 2 is a vertical sectional view taken on an enlarged scale at the line 2—2 of Fig. 1; and Fig. 3 is a face view of a fragmentary portion of the lining of the cover.

Referring now to the several figures of the drawing in which corresponding parts are indicated by the same reference characters, 10 indicates a heavy metal band in the form of a ring adapted to fit loosely about the top of a multiple pan unit such as that shown in Fig. 1 comprising the pans 11, 12 and 13 rigidly connected together in any suitable manner. Upon the band 10 a lining 14 formed of a piece of tin plate or the like is placed in position with an outwardly facing shoulder at 14a opposite to the upper edge portion of the band and with flanges 15 at its sides extending downwardly on the outer face of the band as shown in Fig. 2. The lining 14 is provided with a series of projections 16 pressed therein, such projections being irregular in shape such as might be provided by the use of a round-ed punch used indiscriminately over the whole surface.

Above the lining 14 a cover member 17 of heavy sheet metal is mounted in position, having its side portions 18 turned downwardly about the band and thence upwardly at 19. As is clearly shown in Fig. 2, the cover member is provided with a downwardly open groove 17a pressed therein in position to receive the upper edges of the band 10 and the upwardly extending portions of the cover member at 19. The arrangement is such that the shoulder portion 14a of the lining is gripped tightly between the band and the inside wall of the groove 17a.

Opposite to the intervals between successive pans 11, 12 and 13, openings are provided at 20 through both the lining 14 and the cover member 17 in position to act as vents for permitting the required free circulation of the hot air and other gases during a baking operation. Through the openings 20 ferrules 21 are positioned, being formed of sheet metal pressed into the form of oblong sleeves adapted to be pressed smoothly into engagement with the opposite faces of the metal parts about the openings 20 as is best indicated in Fig. 2. As is clearly shown in Fig. 2, the top flanges 22 of the ferrules are curled under as well as being flattened down smoothly, serving thus to protect the hands of the user from being cut by the metal edges of either the cover or the ferrule.

With the cover 17 in position upon a series of pans in which loaves are being baked, the dough in expanding is brought into contact with the comparatively heavy cover 17 by which it is caused to conform to the desired square formation. The engagement of the projections 16 on the lining 14 with the loaf gives the upper face of the loaf substantially a stippled effect without detracting in any way from the baking operation or the qualities of the bread. With the openings 20 in position at points corresponding with the spaces between the several pans of the structure, the circulation of the air and gases is not interfered with and a normal baking operation is accordingly insured.

By the use of the stippling in the lining member 14, the tendency for a loaf to stick to the cover is very greatly reduced. The presence of the projections 16 also enables the hot gases to escape more readily so as to encourage even baking. Moreover, the cover is much more sanitary than the prior devices having linings made of wire screening, in that the stippled metal does not have any crevices or other openings having square or undercut walls which would be likely to gather and retain dough particles or other foreign matter.

While the form and arrangement of the parts as shown in the drawing and as above described are preferred, the invention is not to be limited to such form and arrangement except so far as the claims may be so limited, it being understood that changes might well be made in the construction without departing from the spirit of the invention.

I claim:

1. In a cover for a baking pan, the combination of a heavy band of metal adapted to fit loosely around the pan structure at the top, a lining for said cover in the form of a sheet of metal extending over the band so as to rest thereon, and a heavy sheet of metal extending across the top face of said lining with its side portions turned downwardly about said band and with a downwardly open groove pressed in the heavy sheet in position to receive the upper edge of the band so as to grip firmly a portion of the lining between the band and the side wall of the groove.

2. In a cover for a baking pan, the combination of a heavy band of metal adapted to fit loosely around the pan structure at the top, a lining for said cover in the form of a sheet of metal extending over the band so as to rest thereon with an outwardly facing shoulder portion of the lining positioned opposite to the upper edge portion of the band, and a heavy sheet of metal extending across the top face of said lining with a downwardly open groove pressed therein in position to receive the upper edge of the band and with the side portions beyond the groove turned downwardly and then upwardly about said band with their upper edge portions positioned between the upper edge portions of the band and the shoulder portions of the lining so as to hold said lining firmly in position.

3. In a cover for a baking pan, the combination of a heavy band of metal adapted to fit loosely about a pan structure at the top, a lining for said cover in the form of a sheet of metal resting on said band and having downwardly extending projections of irregular shape pressed therein at irregular intervals, and a second sheet of metal extending across on top of said lining with its edge portions rolled about said band so as to provide a downwardly open groove into which the edge of the band extends for holding the parts rigidly in position, said cover being adapted to square the top face of a loaf baked in said pan and said projections serving to give an irregular stippled effect to the top face of the loaf.

ADRIEN L. LANGEL.